United States Patent

Murakami et al.

[15] 3,700,719
[45] Oct. 24, 1972

[54] PROCESSES FOR THE PREPARATION OF N-(DIETHYLAMINOETHYL)-4-AMINO-5-CHLORO-2-METHOXYBENZAMIDE

[72] Inventors: Masuo Murakami; Noriyoshi Inukai; Akio Koda, all of Tokyo; Koji Nakano, Saitama, all of Japan

[73] Assignee: Yamanouchi Pharmaceutical Co., Ltd., Tokyo, Japan

[22] Filed: Nov. 17, 1969

[21] Appl. No.: 877,500

[30] Foreign Application Priority Data

Dec. 2, 1968   Japan....................43/87574
Dec. 9, 1968   Japan....................43/89521
Apr. 4, 1969   Japan....................44/26274

[52] U.S. Cl.............260/471 R, 260/559 S, 260/519, 260/474, 260/551 P, 260/516, 260/521 R, 260/544 M, 424/324
[51] Int. Cl...........................................C07c 103/28
[58] Field of Search................260/559 S, 471 R, 519

[56] References Cited

FOREIGN PATENTS OR APPLICATIONS 1,407,055   6/1965   France....................260/559 S

OTHER PUBLICATIONS

Jacs 68: 539– 542 (1946) Grimmel et al.
CA 40: 171 (1946) Martin et al.
CA 64: 1073g (1966) McManus et al.
J. Org. Chem. 32: 1517– 1521 (1967) Tanner Primary Examiner—Henry S. Jiles
Assistant Examiner—S. D. Winters
Attorney—Wenderoth, Lind & Ponack

[57] ABSTRACT

Improved processes for obtaining N-(diethylaminoethyl)-4-amino-5-chloro-2-methoxybenzamide from p-aminosalycylic acid as starting material, each of which comprises only three or four steps.

10 Claims, No Drawings

PROCESSES FOR THE PREPARATION OF N-(DIETHYLAMINOETHYL)-4-AMINO-5-CHLORO-2-METHOXYBENZAMIDE

The present invention relates to new processes for the preparation of N-(diethylaminoethyl)-4-amoni-5-chloro-2-methoxybenzamide. More particularly, this invention relates to improved processes for obtaining N-(diethylaminoethyl)-4-amino-5-chloro-2-methoxybenzamide from p-aminosalicylic acid as starting material, each of which comprises only three or four steps. The invention further relates to new steps contained in the improved processes.

All the steps in the processes of this invention for preparing N-diethylaminoethyl-4-amino-5-chloro-2-methoxybenzamide are shown by the following reaction scheme:

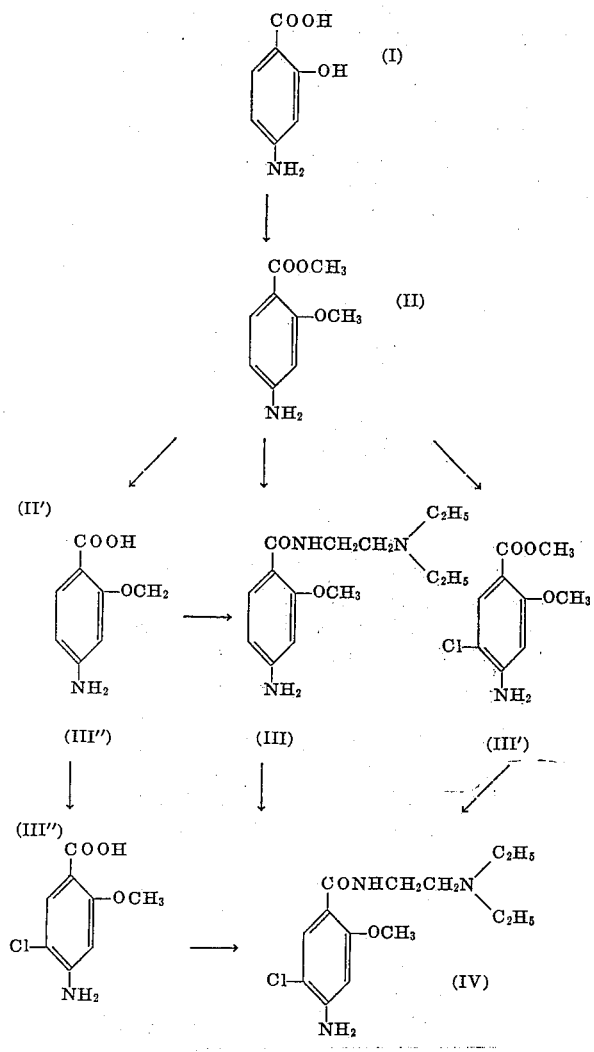

N-(diethylaminoethyl)-4-amino-5-chloro-2-methoxybenzamide, the final product of the processes of this invention, is a known compound which is widely used as an excellent medicament, particularly, for the treatment of functional diseases of digestive organs, such as emesis, anorexia, pyrosis or the like.

As a known process for the preparation of N-(diethylaminoethyl)-4-amino5-chloro-2-methoxybenzamide starting from p-aminosalicylic acid, there is one described in French Pat. Specification No. 1,407,055. In the process of said French Patent, p-aminosalicylic acid is esterified (into methy-ester), acetylated, methylated and chlorinated, successively, to form methyl 4-acetamino-5-chloro-2-methoxybenzoate, and the latter is then reacted with N,N-diethyl ethylenediamine to give N-(diethylaminoethyl)-4-acetamino-5-chloro-2-methoxybenzamide, from which the acetyl group is finally removed off. In such process wherein methylesterification and methylation of p-aminosalicylic acid are effected stepwise, however, it is necessary to protect the amino group while the chlorination. Thus, this known process was troublesome to perform in an industrial scale because it comprised many steps such as steps of acetylating the amino group and splitting off the acetyl group.

The object of the present invention resides in remedying the defects as above of the conventional processes. That is, the object of this invention resides in providing improved processes for the preparation of N-(diethylaminoethyl)-4-amino-5-chloro-2-methoxybenzamide in a simple manner and at a high yield.

Another object of the invention is to provide a process for preparing methyl 4-amino-2-methoxybenzoate from p-aminosalicylic acid in one step.

A further object of the invention is to provide a process for preparing methyl 4-amino-5-chloro-2-methoxybenzoate from methyl 4-amino-2-methoxybenzoate by direct chlorination.

A still another object of the invention is to provide a process for preparing 4-amino-5-chloro-2-methoxybenzoic acid from 4-amino-2-methoxybenzoic acid by direct chlorination.

A still further object of the invention is to provide a process for preparing N-(diethylaminoethyl)-4-amino-5-chloro-2-methoxybenzamide from N-(diethylaminoethyl)-4-amino-2-methoxybenzamide by direct chlorination.

A further object of the invention is to provide a process for preparing N-(diethylaminoethyl)-4-amino-5-chloro-2-methoxybenzamide from 4-amino-5-chloro-2-methoxybenzoic acid (III'').

A further object of the invention is to provide a process for preparing N-(diethylaminoethyl)-4-amino-2-methoxybenzamide (III) from 4-amino-2-methoxybenzoic acid (II').

The other objects as well as the characteristic features, properties, value, etc. of this invention will become apparent from the following description and the claims.

According to the processes of this invention, p-aminosalicylic acid is methylesterified and methylated to give a new compound methyl 2-methoxy-4-aminobenzoate in the first step thereof. This new compound can be converted into the valuable final product of this invention through two or three steps.

According to one embodiment of the present invention, the above methylesterification and methylation can be effected in one step by reacting p-aminosalicylic acid with dimethyl sulfate under alkaline and anhydrous conditions.

Although p-aminosalicylic acid has three functional groups, i.e., carboxyl group, hydroxyl group and amino group, only methylesterification of the carboxyl group and methylation of the hydroxyl group must be effected selectively in the processes of this invention. Such selective methylesterification and methylation can be effected by means of, in addition to the dimethyl sulfate, a methylating agent such as monomethyl sulfate, methyl halide, methyl p-toluenesulfonate or the like.

Anhydrous methanol is not suitable as a methylating agent for the present invention, since only methylesterification occurs with anhydrous methanol and the methylation does not.

The methylesterification and methylation with dimethyl sulfate or the like are carried out preferably in a conventional organic solvent such as acetone, methyl ethyl ketone, tetrahydrofuran, etc. in the presence of an alkaline agent such as potassium hydroxide, sodium hydroxide, etc. The reaction is performed at about room temperature while excluding moisture. In case water is present in the reaction mixture, the product obtained is contaminated with N-methyl compound.

From methyl 2-methoxy-4-aminobenzoate of the formula (II) thus obtained, the final product of the present invention can be derived through two or three steps; through two steps, either (a) by reacting the methylester (II) first with N,N-diethyl ethylenediamine and then chlorinating the product or (b) by first chlorinating the methyl-ester and then reacting the product with N,N-diethyl ethylenediamine, or through three steps, either (c) by hydrolysing the methyl-ester (II), chlorinating the resulting carboxylic acid and reacting the chlorinated carboxylic acid with N,N-diethyl ethylenediamine in the presence of phosphorous trichloride or (d) by hydrolysing the methyl-ester, reacting the resulting carboxylic acid with N,N-diethyl ethylenediamine in the presence of phosphorous trichloride and chlorinating the N,N-diethylaminoethyl benzamide.

The step of reacting methyl 2-methoxy-4-aminobenzoate (II) with N,N-diethyl ethylenediamine in the above process (a) is carried out preferably without any solvent, by heating the reaction mixture at about the boiling point of N,N-diethyl ethylenediamine for 10 to 40 hours. Good result is obtained when N,N-diethyl ethylenediamine is used in excess.

N,N-(diethylaminoethyl)-2-methoxy-4-aminobenzamide thus obtained is then converted into the valuable final product of the present invention by chlorination. The chlorination is effected using iodobenzene dichloride as chlorinating agent. The chlorination with iodobenzene dichloride occurs selectively at 5-position only. It is not only very convenient in achieving the object of the present invention but also chemically new that the chlorination with iodobenzene dichloride occurs selectively at 5-position only, notwithstanding the presence of free amino group at vicinal 4-position.

In an embodiment of the present invention, the chlorination reaction with iodobenzene dichloride is performed by adding it dropwise to a solution of methyl 2-methoxy-4-aminobenzoate in an ordinary organic solvent such as acetone, chloroform, tetrahydrofuran, etc. under cooling, advantageously, at a temperature of 0° – 5° C. Iodobenzene dichloride is slowly added drop by drop, usually in the course of 2 – 4 hours. Addition of a basic agent such as pyridine, chinoline, triethylamine, etc. to the reaction mixture is advantageous, in order to accelerate the chlorination reaction of this invention.

In the process (b) wherein methyl 2-methoxy-4-aminobenzoate is first chlorinated with iodobenzene dichloride and the resulting methyl 2-methoxy-4-amino-5-chlorobenzoate is reacted with N,N-diethyl ethylenediamine, the chlorination reaction and the reaction with N,N-diethyl ethylenediamine are performed in the same manner and under the same reaction conditions as in the process (a).

Besides the two step processes described above, the present invention involves also three step processes for preparing the final product from methyl 4-amino-2-methoxybenzoate.

According to the three step processes, the methylester (II) is first hydrolysed with an alkaline hydroxide such as sodium hydroxide, potassium hydroxide, etc. in a usual manner to give 4-amino-2-methoxybenzoic acid (II'). The compound (II') is converted into the final product of the formula (IV) either by first chlorinating the compound (II') and then reacting the resulting chlorinated product (III'') with N,N-diethyl ethylenediamine according to the process (c), or by first reacting the compound (II') with N,N-diethyl ethylenediamine and then chlorinating the resulting product (III) according to the process (d).

The chlorination reaction in the process (c) of 4-amino-2-methoxybenzoic acid (II') can be performed with iodobenzene dichloride in the same manner as the chlorination in the process (a).

4-amino-5-chloro-2-methoxybenzoic acid so obtained of the formula (III'') is then converted into the final product of this invention by the reaction with N,N-diethyl ethylenediamine. This reaction of the compound (III'') with N,N-diethyl ethylenediamine is carried out in the presence of phosphorus trichloride, in contrast with the same reaction in the processes (a) and (b).

In a preferred embodiment of the invention, the reaction is carried out by mixing and reacting N,N-diethyl ethylenediamine with phosphorus trichloride in an organic solvent such as pyridine, chinoline, triethylamine, etc. at room temperature or under cooling, preferably, at a temperature of 0° – 5° C, adding 4-amino-5-chloro-2-methoxybenzoic acid (III'') to the solution so obtained, and then heating the reaction mixture mildly up to room temperature or higher. The suitable period of time for mixing and reacting N,N-diethyl ethylenediamine with phosphorus trichloride is 0.5 – 2 hours, and the mild heating after the addition of 4-amino-5-chloro-2-methoxybenzoic acid is continued suitably for 1 – 4 hours.

The mechanism of this reaction is still not well confirmed. However, it is considered that N,N-diethyl ethylenediamine reacts first with phosphorus trichloride to form a phosphazo compound according to the following equation:

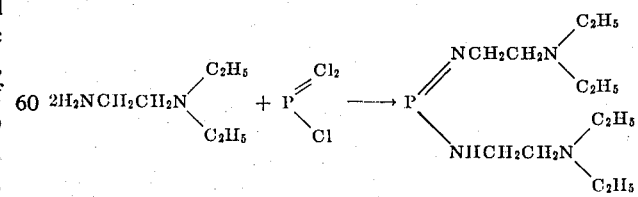

and the phosphazo compound reacts with 4-amino-5-chloro-2-methoxybenzoic acid to yield the final product of this invention. Accordingly, it is sufficient to use about ½ mole of phosphorus trichloride per one mole of N,N-diethyl ethylenediamine.

Finally, in the process (d) the 4-amino-2-methoxybenzoic acid (II') is treated in the reversed order, as compared in the process (c). The reaction of 4-amino-2-methoxybenzoic acid (II') with N,N-diethyl ethylenediamine is performed in the same manner as that of 4-amino-5-chloro-2methoxybenzoic acid with N,N-diethyl ethylenediamine in the process (c). The conversion by chlorination of the resulting N-(diethylaminoethyl)-4-amino-2-methoxybenzamide into the final product of the present invention is effected in the same procedure as explained with regard to the process (a).

The present invention is further illustrated by the following Examples, but, needless to say, the invention is not limited within those Examples which are given only to explain each reaction involved therein.

It is pointed out that there are two known processes for preparing the final product of this invention:

(A) the process represented by the following equation;

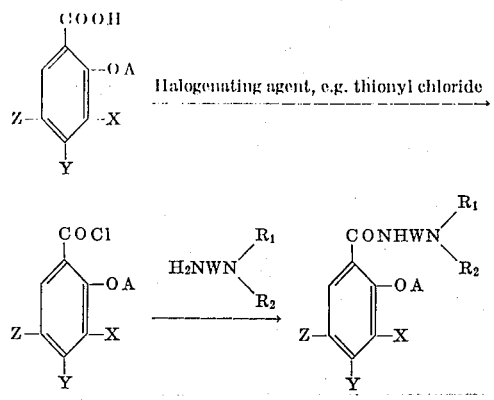

wherein $A$ represents a hydrogen atom or an alkyl group, $X$, $Y$ and $Z$ represent each a hydrogen atom, a halogen atom, an alkoxy group, the amino group, an alkylamino group, an acylamino group or an alkylmercapto group, $W$ represents an alkylene group, and $R_1$ and $R_2$ represent each a lower alkyl group, and (B) the process wherein N-(diethylaminoethyl)-4-amino-2-methoxybenzamide is first acylated, and chlorinated with gaseous chlorine, and then de-acylated. In this respect see U.S. Pat. No. 3,177,252, British Pat. No. 994,023 and Belgian Pat. No. 620,543.

These known processes, however, are both silent on the preparation of the starting materials used therein, and so they cannot be compared with the processes of this invention which start from p-aminosalicylic acid.

Now, provided that the starting material of the above process (A) could be prepared from p-aminosalicylic acid, it is necessary according to the known process (A) to convert the compound (III'') of the process of this invention first into the corresponding acid-chloride compound. Therefore, the process (A) is apparently disadvantageous as compared with the process of this invention wherein the final product can be obtained from the compound (III'') in one step.

On the other hand, the above known process (B) requires two additional steps, i.e., the acylation step and the de-acylation step, in order to obtain the final product from N-(diethylaminoethyl)-4-amino-2-methoxybenzamide by chlorination. Therefore, also the process (B) is troublesome as compared with the process of this invention which does not contain such additional steps.

EXAMPLE 1

Preparation of methyl-4-amino-2-methoxybenzoate;

Into a solution of 410mg of p-aminosalicylic acid in 25ml of anhydrous acetone, 360mg of granulated kalium hydroxide was added. Then 0.7ml of dimethylsulfate was added to the reaction mixture with stirring at room temperature for 20 minutes. After additional stirring was continued for 3 hours, 0.2ml of acetic acid was added to the reaction mixture with stirring for 30 minutes. The reaction mixture was concentrated at room temperature under reduced pressure. The resultant residue was extracted with a mixture of 50ml of ethyl acetate and 20ml of 5 percent aqueous sodium bicarbonate. The ethyl acetate layer was washed three times each with 20ml of 5 percent aqueous sodium bicarbonate and 15ml of water, dried over anhydrous sodium sulfate, and concentrated under reduced pressure to give crude product as white crystals. On recrystallization from ethyl acetate and petroleum ether, 430mg (89 percent) of the product, having a melting point of 155° – ⅜° C, was obtained.

Analysis—$C_9H_{11}NO_3$

|  | C (%) | H (%) | N (%) |
| --- | --- | --- | --- |
| Calcd. | 59.66 | 6.12 | 7.73 |
| Found | 59.59 | 6.19 | 7.88 |

EXAMPLE 2

Preparation of methyl 4-amino-5-chloro-2-methoxybenzoate;

To a solution of 3.62g of methyl 4-amino-2-methoxybenzoate in 100ml of anhydrous tetrahydrofuran, 1.62g of pyridine was added. To the solution 5.5g of iodobenzene dichloride was added dropwise for 4 hours with stirring and cooling. Additional stirring was continued for 2 hours. After standing cool for overnight, the reaction mixture was concentrated. The resultant residue was then extracted with a mixture of 150ml of ethylacetate and 50ml of distilled water. The ethyl acetate layer was washed twice each with 50ml of 1N aqueous hydrochloric acid, 50ml of 5 percent aqueous solution of sodium carbonate and 50ml of distilled water, and dried over anhydrous sodium sulfate. The solution was concentrated under reduced pressure. After addition of 50ml of petroleum benzine, the crystalline residue was finely ground, filtered, and washed with petroleum benzine to give the product as crystals. On recrystallization from methanol 3.2g (75 percent) of the product, having a melting point of 135° C, was obtained. From the petroleum benzine solution, 35g (87 percent) of phenyliodid was recovered.

EXAMPLE 3

Preparation of N-(2-diethylaminoethyl)-4-amino-5-chloro-2-methoxybenzamide;

A mixture of 1.0g of methyl 4-amino-5-chloro-2-methoxy benzoate and 2.7g of N,N-diethyl ethylenediamine was heated to 110° C and refluxed for 10 hours. After cooling, excess N,N-diethyl ethylenediamine was evaporated off under reduced pressure. The resultant residue was washed with water to obtain crude product. On crystallization from benzene, 1g of the product, melting at 143.5° – 144.5° C, was obtained. This product does not show depression of melting point on admixture with authenic sample.

EXAMPLE 4

Preparation of N-(2-diethylaminoethyl)-4-amino-2-methoxybenzamide:

A mixture of 5.0g of methyl 4-amino-2-methoxybenzoate and 16.0g of N,N-diethyl ethylenediamine was heated to reflux for 40 hours with stirring. The excess N,N-diethyl ethylenediamine was evaporated off under reduced pressure. The residue was purified with column chromatography on silicagel using 250ml each of ether-methanol (volume ratio, 5 : 5, 4 : 6, 3 : 7, 2 : 8, 1 : 9, 0 : 10) mixture as eluate. The effluent was combined and the methanol layer was concentrated to obtain 4.0g (55 percent) of the oily pure product. This oily product was treated with picric acid in a conventional manner to give monopicrate of the product, having a melting point of 135.5° – 138° C.

Analysis—$C_{20}H_{26}N_6O_9$

|  | C (%) | H (%) | N (%) |
|---|---|---|---|
| Calcd. | 48.58 | 5.30 | 17.00 |
| Found | 48.87 | 5.47 | 16.68 |

EXAMPLE 5

Preparation of N-(2-diethylaminoethyl)-4-amino-5-chloro-2-methoxybenzamide;

Into a solution of 450mg of N-(2-diethylaminoethyl)-4-amino-2-methoxybenzamide in 10ml of acetone, 470mg of iodobenzene dichloride was added dropwise with stirring and ice cooling for 3 hours. After additional stirring was continued for 30 minutes, acetone was removed from the reaction mixture by evaporation under reduced pressure. Excess iodobenzene dichloride was removed by steam distillation from the residue. The resultant aqueous solution was made basic by addition of 300mg of sodium bicarbonate, and extracted with a small amount of chloroform. The extract was washed with 5 percent aqueous solution of sodium bicarbonate and water, and dried over anhydrous magnesium sulfate, and concentrated under reduced pressure to give crude product as crystals. On recrystallization from ethylacetate and petroleum ether, 370mg (73 percent) of the product, melting point of 143° – 144.5° C, was obtained.

EXAMPLE 5 B

Preparation of N-(2-diethylaminoethyl)-4-amino-5-chloro-2-methoxybenzamide;

Into a solution of 0.77g of N,N-diethylaminoethyl-4-amino-2-methoxybenzamide in 20ml of chloroform, 0.81g of phenyliododichloride was added dropwise for 4 hours under ice cooling. The reaction mixture was washed with 5ml of 5 percent aqueous sodium bicarbonate and 5ml of water, and dried over anhydrous magnesium sulfate. The reaction mixture was concentrated under reduced pressure to obtain crude product as crystals. On recrystallization from ethyl acetate 0.65g (75 percent) of the product, having a melting point of 143° – 144.5° C, were obtained.

Analysis—$C_{14}H_{22}N_3O_2CL$

|  | C(%) | H(%) | N% |
|---|---|---|---|
| Calcd. | 56.09 | 7.40 | 14.02 |
| Found | 56.11 | 7.32 | 13.88 |

EXAMPLE 5 C

Preparation of N-(2-diethylaminoethyl)-4-amino-5-chloro-2-methoxybenzamide;

Into a solution of 0.77g of N-(2-diethlyaminoethyl)-4-amino-2-methoxybenzamide in 20ml of chloroform, 0.81g of iodobenzene dichloride was added dropwise for 4 hours with stirring under ice cooling. The reaction mixture was washed with 5ml of 5 percent aqueous sodium bicarbonate and 5ml of water, then dried over anhydrous magnesium sulfate. The chloroform was evaporated off under reduced pressure to obtain crystalline residue of the product. On recrystallization from ethyl acetate, 0.65g (75 percent) of the product, as platelet crystals, having a melting point of 143° – 144.5° C, was obtained.

Analysis—$C_{14}H_{22}N_3O_2Cl$

|  | C (%) | H (%) | N (%) |
|---|---|---|---|
| Calcd. | 56.09 | 7.40 | 14.02 |
| Found | 56.11 | 7.32 | 13.88 |

EXAMPLE 6

Preparation of 4-amino-2-methoxybenzoic acid;

Into a solution of 100ml of methanol and 10g of kalium hydroxide in 40ml of water, 15.1g of methyl 4-amino-2-methoxybenzoate was added and heated to reflux for 2 hours. The reaction mixture was cooled, made free from a small amount of insoluble impurities by filtration and concentrated under reduced pressure. The residue was dissolved in 50ml of water and the solution was made pH to 5 by addition of 3N aqueous hydrochloric acid, the crude crystalline product was precipitated and collected by filtration, washed with water and dried. The crude crystals (14.6g) were added into 35ml of methanol, warmed in a water-bath, then cooled in chilled water. The crystals were collected by filtration, washed with 15ml of cold methanol and dried to give 13g (93 percent) of the pure product as white crystals, having a melting point of 149° – 150° C.

Analysis—$C_8H_9NO_3$

|  | C (%) | H (%) | N (%) |
|---|---|---|---|
| Calcd. | 57.48 | 5.43 | 8.37 |
| Found | 57.08 | 5.19 | 8.37 |

EXAMPLE 7

Preparation of N-(2-diethylaminoethyl)-4-amino-2-methoxybenzamide;

To a solution of 1.2g of N,N-diethylethylenediamine in 20ml of pyridine, a solution of 0.7g of phosphorus trichloride in 4ml of pyridine was added dropwise for half an hour with stirring and cooling at 0° to −5° C. After additional stirring for half an hour at 0° to −5° C and for 1 hour at room temperature, 0.9g of 4-amino-2-methoxybenzoic acid was added to the solution for 45 minutes at room temperature with stirring. Additional stirring was continued for 4 hours at 90° to 100° C. After cooling, the pyridine was evaporated off under reduced pressure. To the oily residue was added 50ml of 10 percent aqueous sodium carbonate and the solution was extracted with the chloroform, and dried over anhydrous magnesium sulfate. The chloroform solution was concentrated under reduced pressure to obtain the product as crystals. On recrystallization from benzene, 0.9g (82 percent) of the product, having a melting point of 135.5° – 138° C, were obtained. The product does not show the depression of melting point on admixture with the authenic sample.

EXAMPLE 8A

Preparation of 4-amino-5-chloro-2-methoxybenzoic acid;

Into a solution of 167mg of 4-amino-2-methoxybenzoic acid in 5ml of anhydrous acetone, 138mg of iodobenzene dichloride was added dropwise with stirring under ice cooling for 4 hours. After standing cool for overnight, 89mg of 4-amino-2-methoxybenzoic acid hydrochloride which precipitated was filtered, and the filtrate was concentrated under reduced pressure to obtain crystalline residue. After addition of 5ml of distilled water the crystalline residue was ground, filtered and washed with water. The obtained white crystals were dissolved in 30ml of ethyl acetate, washed twice each with 10ml of 1N aqueous hydrochloric acid and 10ml of distilled water and dried over anhydrous sodium sulfate. The solution was concentrated under reduced pressure to give 7lml (71 percent) of the product as white crystals, melting at 208° C.

Analysis—$C_8H_8NO_3Cl$

|  | C (%) | H (%) | N (%) |
|---|---|---|---|
| Calcd. | 47.66 | 4.00 | 6.95 |
| Found | 47.65 | 3.85 | 6.78 |

EXAMPLE 8 B

Preparation of 4-amino-5-chloro-2-methoxybenzoic acid;

Into a solution of 167mg of 4-amino-2-methoxybenzoic acid in 5ml of anhydrous acetone, 138mg of iodobenzene dichloride was added dropwise with stirring and ice cooling for 4 hours. After standing to cool for overnight, 87mg of hydrochloride of 4-amino-2-methoxybenzoic acid which precipitated out was filtered off, and the filtrate was concentrated under reduced pressure to obtain crystalline residue. After addition of 5ml of water, the crystalline residue was ground, filtered and washed with water. The obtained white crystals were dissolved in 30ml of ethyl acetate, washed twice each with 10ml of 1N aqueous hydrochloric acid and 10ml of water, and dried over anhydrous sodium sulfate. The solution was concentrated under reduced pressure to give 70mg (70 percent) of the product as white crystals, melting at 208° – 9° C.

Analysis—$C_8H_8NO_3Cl$

|  | C (%) | H (%) | N (%) |
|---|---|---|---|
| Calcd. | 49.66 | 4.00 | 6.95 |
| Found | 47.65 | 3.85 | 6.78 |

EXAMPLE 8 C

Preparation of 4-amino-5-chloro-2-methoxybenzoic acid;

Into a solution of 2.76g of 4-amino-2-methoxybenzoic acid in 100ml of anhydrous tetrahydrofuran, 1.62g of iodobenzene dichloride was added dropwise with stirring under ice cooling for 4 hours, and additional stirring was continued for 2 hours. After standing cool for overnight, the reaction mixture was concentrated and the residue was then extracted with a mixture of 150ml of ethyl acetate and 50ml of water. The ethyl acetate layer was washed twice each with 50ml of 1N aqueous hydrochloric acid, 50ml of 5 percent aqueous sodium bicarbonate and 50ml of water, and dried over anhydrous sodium sulfate. The solution was concentrated under reduced pressure to obtain the crude product as crystals. After addition of 50ml of petroleum benzine, the crude product was finely ground, filtered, and washed with petroleum benzine. On recrystallization from methanol, 2.49g (72 percent) of the product as white crystals, having a melting point 208° – 209° C, was obtained.

EXAMPLE 0A

Preparation of N-(2-diethylaminoethyl)-4-amino-5-chloro-2-methoxybenzamide;

To a solution of 1.2g of N,N-diethyl ethylenediamine in 20ml of pyridine, a solution of 0.7g of phosphorous trichloride in 4ml of pyridine was added dropwise with stirring and cooling at 0° to –5° C for half an hour. Additional stirring was continued for half an hour at 0° to –5° C and an hour at room temperature. Then 1.0g of 4-amino-5-chloro-2-methoxybenzoic acid was added to the above obtained solution with stirring for 3 hours at 90° to 100° C. After cooling, the solvent was evaporated off under reduced pressure to obtain oily residue. To the oily residue, 50ml of 10 percent aqueous solution of sodium carbonate was added, and extracted with chloroform. The chloroform solution was dried over anhydrous magnesium sulfate. The crude product was obtained as crystals by concentration under reduced pressure. On recrystallization from benzene, 1.2g (81 percent) of the product, having a melting point of 143.5° – 144.5° C, was obtained.

Analysis—$C_{14}H_{22}N_3O_2Cl$

|  | C (%) | H (%) | N (%) |
|---|---|---|---|
| Calcd. | 56.09 | 7.40 | 14.02 |
| Found | 56.11 | 7.24 | 13.87 |

EXAMPLE 9 B

Preparation of N-(2-diethylaminoethyl)-4-amino-5-chloro-2-methoxybenzamide;

To a solution of 1.2g of N,N-diethyl ethylenediamine in 20ml of pyridine, a solution of 0.7g of phosphorous trichloride in 4ml of pyridine was added dropwise for half an hour with stirring and cooling at 0° to –5° C. After additional stirring for half an hour at 0° to –5° C and for an hour at room temperature, 1.0 of 4-amino-5-chloro-2-methoxybenzoic acid was added to the solution. The reaction mixture was stirred for 3 hours at 90° to 100° C. After cooling, the pyridine was evaporated off under reduced pressure, and the resultant oily residue was then dissolved in 110ml of chloroform and a small amount of insoluble impurities was filtered off. The solution was washed three times each with 17ml of 10 percent aqueous sodium carbonate and a small amount of water, and dried over anhydrous magnesium sulfate. From the solution, the crude product was obtained as crystals by concentration under reduced pressure. On recrystallization from benzene, 1.3g (85 percent) of the product, having a melting point of 143° – 144.5° C was obtained.

Analysis—$C_{14}H_{22}N_3O_2Cl$

|  | C (%) | H (%) | N (%) |
|---|---|---|---|
| Calcd. | 56.09 | 7.40 | 14.02 |
| Found | 56.11 | 7.32 | 13.88 |

What is claimed is:

1. A process for the preparation of N-(diethylaminoethyl)-4-amino-5-chloro-2-methoxybenzamide which comprises reacting p-aminosalicylic acid with a methylating agent selected from the group consisting of dimethylsulfate, monomethyl sulfate, methyl halide and methyl p-toluenesulfonate under alkaline and anhydrous conditions to yield methyl 4-amino-2-methoxybenzoate (II), reacting II with iodobenzene dichloride under cooling to yield methyl 4-amino-5-chloro-2-methoxybenzoate (III') and reacting compound III' with N,N-diethyl ethylenediamine.

2. A process for the preparation of N-(diethylaminoethyl)-4-amino-5-chloro-2-methoxybenzamide which comprises reacting p-aminosalicylic acid with a methylating agent selected from the group consisting of dimethylsulfate, monomethyl sulfate, methyl halide and methyl p-toluenesulfonate under alkaline and anhydrous conditions to yield methyl 4-amino-2-methoxybenzoate (II), reacting compound II with N,N-diethyl ethylenediamine to give N-(diethylaminoethyl)-4-amino-2-methoxybenzamide (III) and reacting compound III with iodobenzene dichloride under cooling.

3. A process for the preparation of N-(diethylaminoethyl)-4-amino-5-chloro-2-methoxybenzamide which comprises reacting p-aminosalicylic acid with a methylating agent selected from the group consisting of dimethylsulfate, monomethyl sulfate, methyl halide and methyl p-toluenesulfonate under alkaline and anhydrous conditions to yield methyl 4-amino-2-methoxybenzoate (II), reacting compound II with a basic agent to yield 4-amino-2-methoxybenzoic acid (II'), reacting compound II' with N,N-diethyl ethylenediamine in the presence of phosphorous trichloride and reacting the N-(diethylaminoethyl)-4-amino-2-methoxybenzamide thus obtained with iodobenzene dichloride under cooling.

4. A process for the preparation of N-(diethylaminoethyl)-5-chloro-4-amino-2-methoxybenzamide which comprises reacting p-aminosalicylic acid with a methylating agent selected from the group consisting of dimethylsulfate, monomethyl sulfate, methyl halide and methyl p-toluenesulfonate under alkaline and anhydrous conditions to yield methyl 4-amino-2-methoxybenzoate (II), reacting compound II with a basic agent to yield 4-amino-2-methoxybenzoic acid (II'), reacting compound II' with iodobenzene dichloride under cooling and reacting the 5-chloro-4-amino-2-methoxybenzoic acid thus obtained with N,N-diethyl ethylenediamine in the presence of phosphorous trichloride.

5. A process for the preparation of methyl 4-amino-2-methoxybenzoate which comprises reacting p-aminosalicylic acid with a methylating agent selected from the group consisting of dimethylsulfate, monomethyl sulfate, methyl halide and methyl p-toluenesulfonate under alkaline and anhydrous conditions.

6. A process for the preparation of methyl 5-chloro-4-amino-2-methoxybenzoate which comprises reacting methyl 4-amino-2-methoxybenzoate with iodobenzene dichloride under cooling.

7. A process for the preparation of N-(diethylaminoethyl)-5-chloro-4-amino-2-methoxybenzamide which comprises reacting N-(diethylaminoethyl)-4-amino-2-methoxybenzamide with iodobenzene dichloride under cooling.

8. A process for the preparation of 5-chloro-4-amino-2-methoxybenzoic acid which comprises reacting 4-amino-2-methoxybenzoic acid with iodobenzene dichloride under cooling.

9. A process for the preparation of N-(diethylaminoethyl)-4-amino-2-methoxybenzamide which comprises reacting 4-amino-2-methoxybenzoic acid with N,N-diethyl ethylenediamine in the presence of phosphorus trichloride.

10. A process for the preparation of N-(diethylaminoethyl)-5-chloro-4-amino-2-methoxybenzamide which comprises reacting 5-chloro-4-amino-2-methoxybenzoic acid with N,N-diethyl ethylenediamine in the presence of phosphorus trichloride.

* * * * *